(12) United States Patent
Quilling

(10) Patent No.: US 6,745,722 B1
(45) Date of Patent: Jun. 8, 2004

(54) COLLAR BALL SYSTEM

(76) Inventor: Raymond L. Quilling, 4692 Hwy. 93 W., Whitefish, MT (US) 59937

( * ) Notice: Subject to any disclaimer, the term of this patent is extended or adjusted under 35 U.S.C. 154(b) by 0 days.

(21) Appl. No.: 10/405,453

(22) Filed: Apr. 3, 2003

(51) Int. Cl.$^7$ ............................................. A01K 27/00
(52) U.S. Cl. ...................... 119/795; 119/769; 119/792
(58) Field of Search ................... 119/795, 769, 119/783, 792, 758; 43/2, 3; 482/108, 74; 206/315.1; 114/294, 300, 311; 280/187

(56) References Cited

U.S. PATENT DOCUMENTS

| | | | | | |
|---|---|---|---|---|---|
| 207,963 | A | * | 9/1878 | Hallner et al. ............... | 119/758 |
| 229,691 | A | * | 7/1880 | Gerard ......................... | 119/758 |
| 243,954 | A | * | 7/1881 | North ........................... | 43/3 |
| 261,334 | A | * | 7/1882 | Goldsmith .................... | 114/300 |
| 283,240 | A | * | 8/1883 | Heaton ......................... | 119/758 |
| 450,633 | A | * | 4/1891 | Motter .......................... | 242/379 |
| 460,270 | A | * | 9/1891 | Somerby ....................... | 482/108 |
| 704,730 | A | * | 7/1902 | Zierleyn ....................... | 119/769 |
| 734,062 | A | * | 7/1903 | Harris .......................... | 482/108 |
| 843,543 | A | * | 2/1907 | Matsumoto .................. | 119/769 |
| 1,789,649 | A | * | 1/1931 | Gazecki et al. ............... | 43/3 |
| 3,172,394 | A | * | 3/1965 | Taylor .......................... | 119/758 |
| 3,189,003 | A | * | 6/1965 | Canfield ....................... | 119/784 |
| 3,754,524 | A | * | 8/1973 | Locks ........................... | 114/294 |
| 4,090,463 | A | * | 5/1978 | Soderberg .................... | 114/294 |
| 4,720,098 | A | * | 1/1988 | Gordon ........................ | 482/108 |
| 5,003,929 | A | * | 4/1991 | Dean ............................ | 119/784 |
| 5,456,214 | A | * | 10/1995 | Quilling ........................ | 119/795 |
| 5,823,922 | A | * | 10/1998 | Eckmann ..................... | 482/108 |
| 6,435,137 | B1 | * | 8/2002 | Hourihan ..................... | 119/788 |
| 6,435,468 | B1 | * | 8/2002 | Simchoni ..................... | 248/519 |
| 6,490,988 | B2 | * | 12/2002 | Caprioglio ................... | 114/293 |
| 6,499,436 | B1 | * | 12/2002 | Capperrune ................. | 119/792 |
| 6,536,376 | B2 | * | 3/2003 | Brown .......................... | 119/769 |

* cited by examiner

Primary Examiner—Peter M. Poon
Assistant Examiner—Joan M. Olszewski
(74) Attorney, Agent, or Firm—Edward P. Dutkiewicz

(57) ABSTRACT

A collar ball system has a plurality of rigid heavy metallic spherical balls coupled by a weld. A link has an inner end embedded in the weld and an outer end adapted to be clipped to one end of a leash. Free inner ends of a generally U-shaped handle are in contact with the balls. A plastic coating is secured over the balls, link and handle and tends, with the weld, to hold the balls, link and handle together and protect the balls, link and handle from the elements and abuse from a pet being tethered.

4 Claims, 3 Drawing Sheets

COLLAR BALL SYSTEM

BACKGROUND OF THE INVENTION

1. Field of the Invention

The present invention relates to a collar ball system and more particularly pertains to tethering a pet in a safe and convenient manner.

2. Description of the Prior Art

The use of pet restraints of known designs and configurations is known in the prior art. More specifically, pet restraints of known designs and configurations previously devised and utilized for the purpose of tethering a pet through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 229,691 issued July 1880 to Gerard discloses a tether. U.S. Pat. No. 283,240 issued August 1883 to Heaton discloses an animal tethering device. U.S. Pat. No. 704,730 issued July 1902 to Zierleyn discloses hitching weights. U.S. Pat. No. 762,439 issued June 1904 to Reddish discloses a hitching weight. U.S. Pat. No. 876,328 issued January 1908 to Chamberlin discloses a hitching weight or anchor. U.S. Pat. No. 3,172,394 issued March 1965 to Taylor discloses restraining devices. U.S. Pat. No. 3,648,664 issued Mar. 14, 1972, to Nunley discloses an animal tethering apparatus and the like. U.S. Pat. No. 3,754,524 issued August 1973 to Locks discloses a boat anchor. U.S. Pat. No. 3,722,478 issued Mar. 27, 1973, to Smith discloses a tether assembly. U.S. Pat. No. 4,090,463 issued May 1978 to Soderberg discloses an anchoring means. U.S. Pat. No. 4,862,833 issued Sep. 5, 1989, to Brotz discloses an animal tether device. U.S. Pat. No. 4,827,876 issued May 9, 1989, to Krekelberg discloses a dog leash attachment. U.S. Pat. No. 4,951,592 issued August 1990 to Barongan discloses process of forming a boat anchor. U.S. Pat. No. 5,003,929 issued Apr. 2, 1991, to Dean discloses a tangle resistant pet tie apparatus and method. Lastly, U.S. Pat. No. 5,456,214 issued Oct. 10, 1995, to Quilling discloses tether balls and leash for tethering pets.

While these devices fulfill their respective, particular objectives and requirements, the aforementioned patents do not describe a collar ball system that allows tethering a pet in a safe and convenient manner.

In this respect, the collar ball system according to the present invention substantially departs from the conventional concepts and designs of the prior art, and in doing so provides an apparatus primarily developed for the purpose of tethering a pet in a safe and convenient manner.

Therefore, it can be appreciated that there exists a continuing need for a new and improved collar ball system which can be used for tethering a pet in a safe and convenient manner. In this regard, the present invention substantially fulfills this need.

SUMMARY OF THE INVENTION

In view of the foregoing disadvantages inherent in the known types of pet restraints of known designs and configurations now present in the prior art, the present invention provides an improved collar ball system. As such, the general purpose of the present invention, which will be described subsequently in greater detail, is to provide a new and improved collar ball system and method which has all the advantages of the prior art and none of the disadvantages.

To attain this, the present invention essentially comprises a pair of rigid heavy metallic spherical balls. The balls are of a common diameter. The balls are adapted to function as a weight for tethering purposes. A weld couples the balls at a close distance from each other.

Next, a generally oval shaped link is provided. The link has an inner end embedded in the weld between the two balls and secured thereto. The link also has an outer end adapted to be clipped to one end of a leash. The link has an intermediate extent.

A generally U-shaped handle is next provided. The handle has free inner ends in contact with the balls at parallel radii rotationally offset at about 45 degrees from the link. The handle has a linear component. The linear component has a length slightly greater when the diameter of one ball.

Next provided is a plastic coating. The plastic coating is secured over the balls, link and handle. The plastic coating with the weld tends to hold the balls, link and handle together. The plastic coating protects the balls, link and handle from the elements and abuse from a pet being tethered.

Finally, a leash is provided. The leash has a first end and a second end. The first end has a clip for removably coupling to the outer end of the link. The second end is adapted to removably couple to a pet to be tethered.

There has thus been outlined, rather broadly, the more important features of the invention in older that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collar ball system which has all of the advantages of the prior art pet restraints of known designs and configurations and none of the disadvantages.

It is another object of the present invention to provide a new and improved collar ball system which may be easily and efficiently manufactured and marketed.

It is further an object of the present invention to provide a new and improved collar ball system which is of durable and reliable constructions.

An even further object of the present invention is to provide a new and improved collar ball system which is susceptible of a low cost of manufacture with regard to both materials and labor, and which accordingly is then susceptible of low prices of sale to the consuming public, thereby making such collar ball system economically available to the buying public.

Even still another object of the present invention is to provide a collar ball system for tethering a pet in a safe and convenient manner.

Lastly, it is an object of the present invention to provide a new and improved collar ball system having a plurality of rigid heavy metallic spherical balls coupled by a weld. A link has an inner end embedded in the weld and an outer end adapted to be clipped to one end of a leash. Free inner ends of a generally U-shaped handle are in contact with the balls. A plastic coating is secured over the balls, link and handle and tends, with the weld, to hold the balls, link and handle together and protect the balls, link and handle from the elements and abuse from a pet being tethered.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
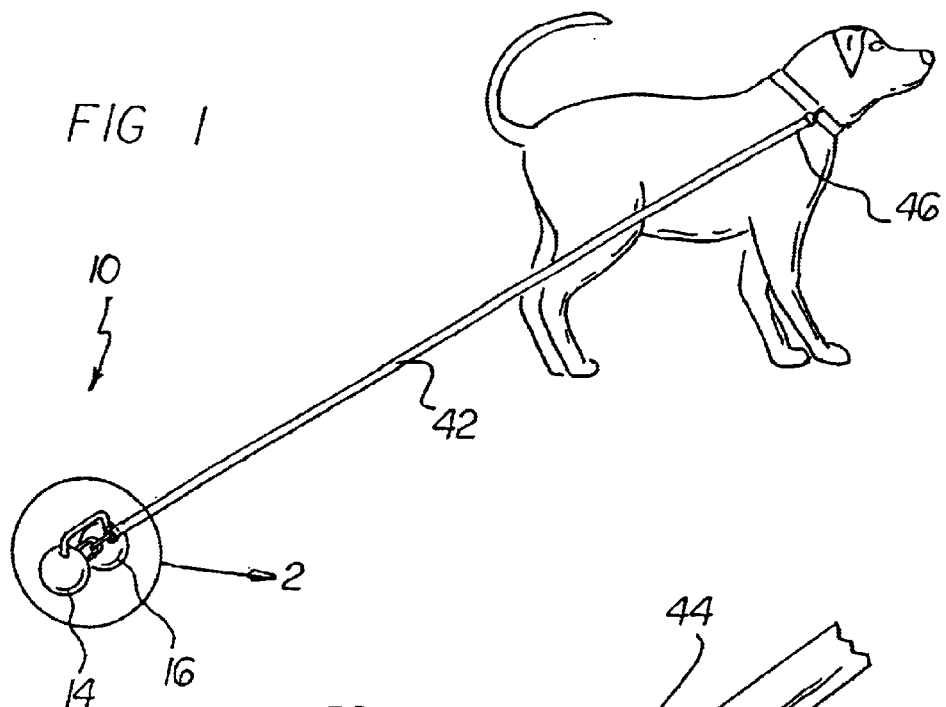
FIG. 1 discloses the preferred embodiment of the new and improved collar balls for tethering a pet constructed in accordance with the principles of the present invention.
Figure 2:
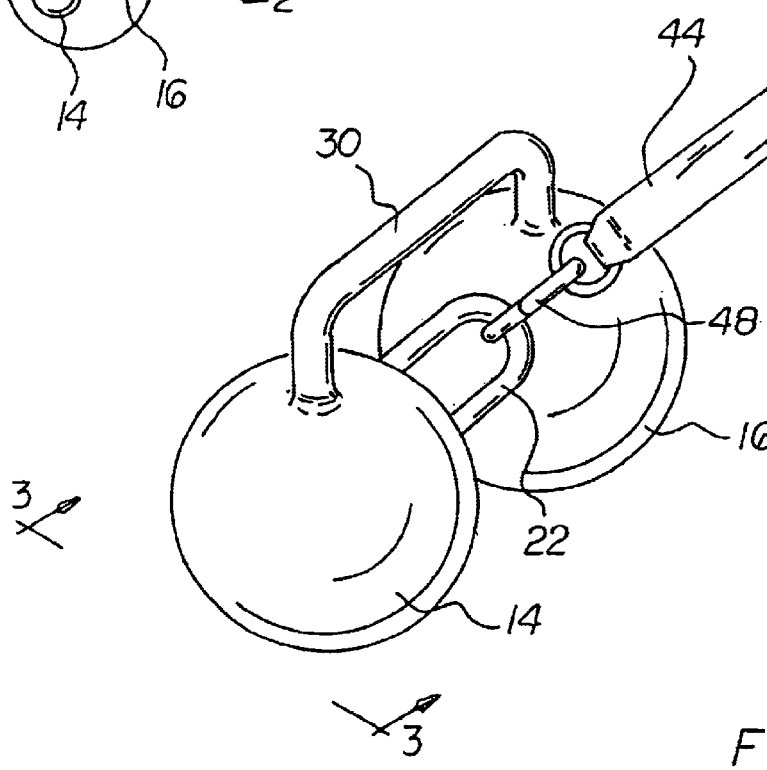
FIG. 2 is an enlarged perspective view of the lower end of the leash and the collar balls as shown at Circle 1 of FIG. 1.
Figure 3:
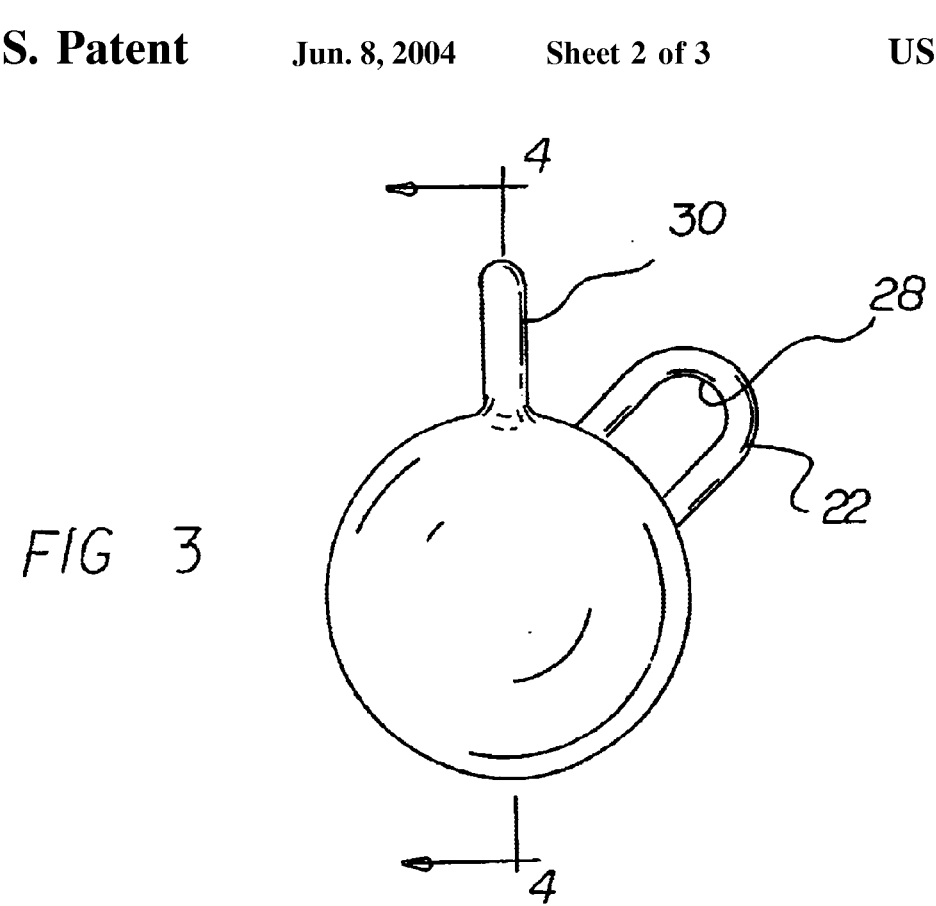
FIG. 3 is a side elevational view of the collar balls taken along lines 3—3 of FIG. 2.
Figure 4:
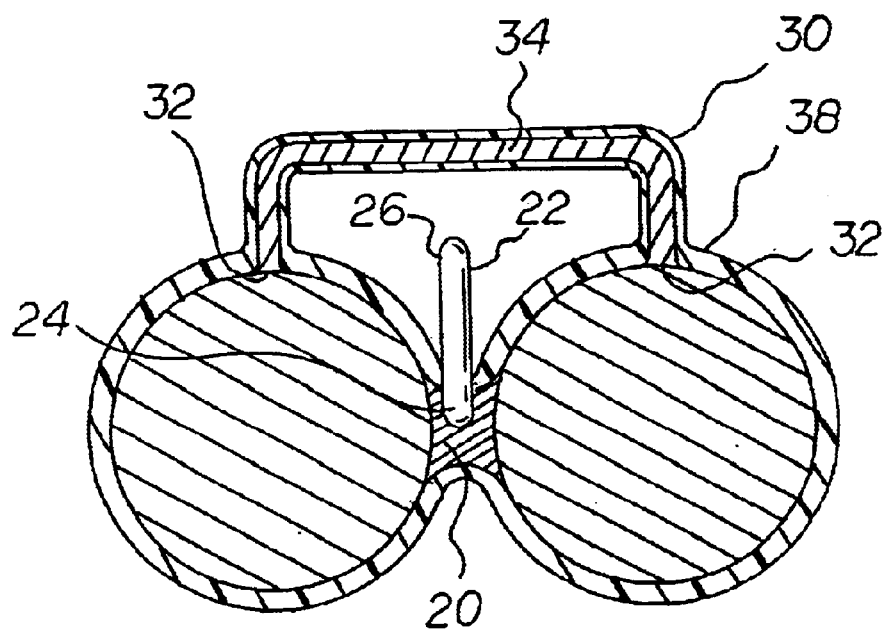
FIG. 4 is a cross sectional view of the collar balls taken at line 4—4 of FIG. 3.

With reference now to the drawings, and in particular to FIG. 1 thereof, the preferred embodiment of the new and improved collar ball system embodying the principles and concepts of the present invention and generally designated by the reference numeral 10 will be described.

The present invention, the collar ball system 10 is comprised of a plurality of components. Such components in their broadest context include a plurality of rigid heavy metallic spherical balls, a weld, a link, a generally H-shaped handle, and a plastic coating. Such components are individually configured and correlated with respect to each other so as to attain the desired objective.

First provided are a pair of rigid heavy metallic spherical balls 14, 16. The balls are of a common diameter. The balls are adapted to function as a weight for tethering purposes.

A weld 20 is next provided. The weld couples the balls at a close distance from each other.

Next, a generally oval shaped link 22 is provided. The link has an inner end 24 embedded in the weld between the two balls and secured thereto. The link also has an outer end 26. The outer end is adapted to be clipped to one end of a leash. The link has an intermediate extent 28.

A generally U-shaped handle 30 is next provided. The handle has free inner ends 32 in contact with the balls at parallel radii rotationally offset at about 45 degrees from the link. The handle has a linear component 34. The linear component has a length slightly greater than the diameter of one ball.

Next provided is a plastic coating 38. The plastic coating is secured over the balls, link and handle. The plastic coating with the weld tends to hold the balls, link and handle together. The plastic coating protects the balls, link and handle from the elements and abuse from a pet being tethered.

Finally, a leash 42 is provided. The leash has a first end 44 and a second end 46. The first end has a clip 48 for removably coupling to the outer end of the link. The second end is adapted to be removably coupled to a pet to be tethered.

Figure 5:
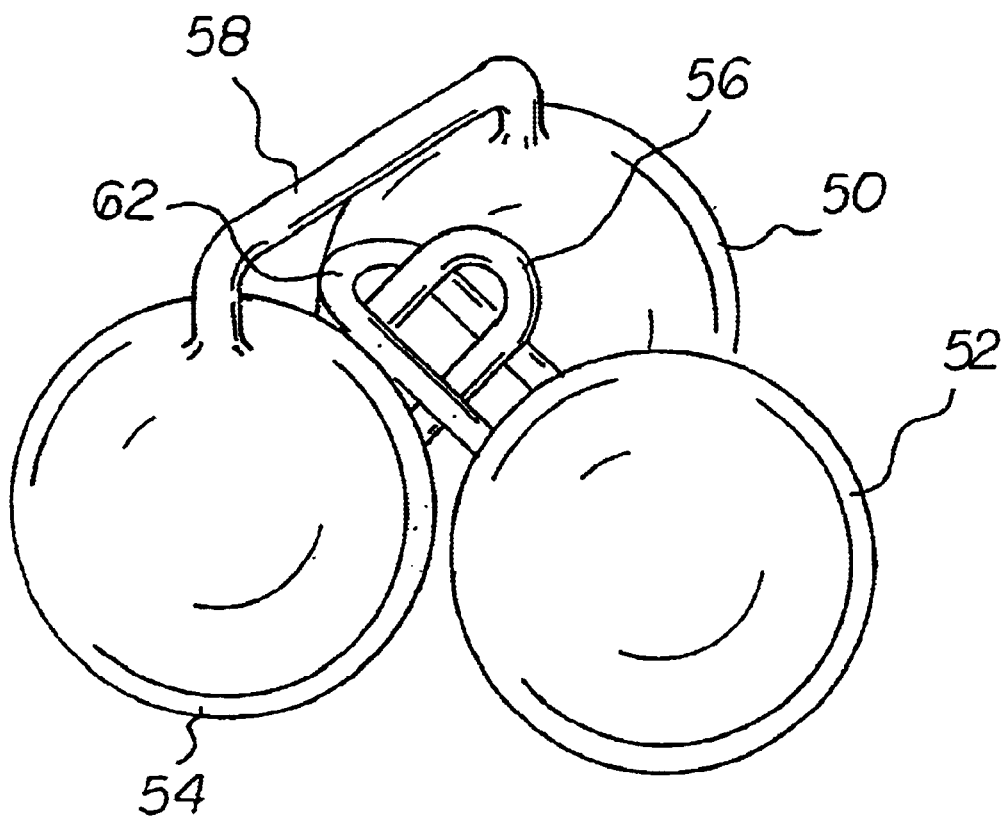
FIG. 5 is a perspective view of collar balls constructed in accordance with an alternate embodiment of the invention.

An alternate embodiment of the invention is shown in FIG. 5. In this embodiment, three balls 50, 52, 54 are provided. This embodiment has a single link 56 and a single handle 58. More specifically, this embodiment includes a first ball 50 and a second ball 54 as in the first embodiment with a single link 56 therebetween and a single handle 58 therebetween also as in the first embodiment. The system also includes a third ball 52 unlike the first embodiment, with a link 62 coupled thereto for removably receiving the link 56 between the first and second balls.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A collar ball system for tethering a pet in a safe and convenient manner comprising, in combination:

a pair of rigid heavy metallic spherical balls, each with a common diameter and adapted to function as a weight for tethering purposes;

a weld coupling the balls at a close distance from each other;

a generally oval shaped link having an inner end embedded in the weld between the two balls and secured thereto and having an outer end, the link having an intermediate extent;

a generally U-shaped handle having free inner ends in contact with the balls at parallel radii rotationally offset at about 45 degrees from the link with a linear component having a length slightly greater than the diameter of one ball;

a plastic coating secured over the balls, link and handle tending with the weld to hold the balls, link and handle together and to protect the balls, link and handle from the elements and abuse from the pet being tethered; and a leash with a first end and a second end, the first end having a clip for removably coupling to the outer end of the link, the second end adapted to removably coupled to a pet to be tethered.

2. A collar ball system comprising:

a plurality of rigid heavy metallic spherical balls;

a weld coupling a first and second ball;

a link having an inner end embedded in the weld and having an outer end adapted to be clipped to one end of a leash;

a generally U-shaped handle having free inner ends in contact respectively with the first and second balls with the balls;

a plastic coating secured over the balls, link and handle tending with the weld to hold the balls, link and handle together and to protect the balls, link and handle from the elements and abuse from a pet being tethered.

3. The system as set forth in claim 2 wherein there are only two balls with the one link and the one handle.

4. The system as set forth in claim 2 wherein there are three balls, the third ball having a supplemental link coupled thereto for removably receiving the link between the first and second balls.

* * * * *